United States Patent
Markou et al.

(10) Patent No.: US 12,410,533 B2
(45) Date of Patent: Sep. 9, 2025

(54) CATHODIC ELECTROCOATING COMPOSITION HAVING REDUCED VOLATILE ORGANIC COMPOUNDS

(71) Applicant: AXALTA COATING SYSTEMS IP CO., LLC, Wilmington, DE (US)

(72) Inventors: Konstantinos Markou, Cologne (DE); Tim Kösterke, Breckerfeld (DE); Thomas Huesmann, Solingen Gräfrath (DE)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 464 days.

(21) Appl. No.: 17/804,336

(22) Filed: May 27, 2022

(65) Prior Publication Data

US 2022/0389602 A1 Dec. 8, 2022

Related U.S. Application Data

(60) Provisional application No. 63/194,218, filed on May 28, 2021.

(51) Int. Cl.
*C25D 1/00* (2006.01)
*C08K 5/053* (2006.01)
*C09D 163/00* (2006.01)

(52) U.S. Cl.
CPC ............... *C25D 1/00* (2013.01); *C08K 5/053* (2013.01); *C09D 163/00* (2013.01)

(58) Field of Classification Search
CPC .......... C25D 1/00; C25D 13/14; C25D 13/12; C25D 13/20; C25D 13/16; C25D 13/04; C08K 5/053; C09D 163/00; C09D 5/4473; C09D 5/4434; C09D 7/63; C09D 5/4442; C09D 5/4457; C08F 220/1804; C08F 212/08; C08F 220/06; C08F 220/20; C08F 220/585; C08L 71/00; C08L 33/08

See application file for complete search history.

(56) References Cited

U.S. PATENT DOCUMENTS

| | | | |
|---|---|---|---|
| 3,975,250 A | 8/1976 | Marchetti et al. | |
| 4,419,467 A | 12/1983 | Wismer et al. | |
| 5,369,190 A | 11/1994 | Honig et al. | |
| 6,207,731 B1 | 3/2001 | Gam | |
| 6,369,134 B2 | 4/2002 | Ando et al. | |
| 6,476,101 B2 | 11/2002 | Takegawa et al. | |
| 7,456,234 B2 | 11/2008 | Kojima et al. | |
| 7,994,263 B2 | 8/2011 | Nishiguchi et al. | |
| 10,370,545 B2 | 8/2019 | Lee et al. | |
| 2002/0139673 A1 | 10/2002 | Kojima et al. | |
| 2012/0175261 A1 | 7/2012 | Gam | |
| 2016/0024310 A1* | 1/2016 | McMullin | C09D 7/62 523/400 |
| 2016/0201093 A1* | 7/2016 | Breuer | C12Y 114/15003 435/157 |
| 2020/0216685 A1 | 7/2020 | Lee et al. | |
| 2022/0154014 A1* | 5/2022 | Nagai | C08G 18/3848 |

FOREIGN PATENT DOCUMENTS

| | | |
|---|---|---|
| CN | 1703469 A | 11/2005 |
| CN | 102196844 A | 9/2011 |
| CN | 102256920 A | 11/2011 |
| CN | 107075261 A | 8/2017 |
| CN | 108864885 A | 11/2018 |
| EP | 0430290 A2 | 6/1991 |
| EP | 476514 B1 | 8/1995 |
| EP | 1384760 A1 | 1/2004 |
| JP | 5567767 B2 | 8/2014 |
| JP | 5595131 B2 | 9/2014 |
| KR | 101570683 B1 | 11/2015 |
| WO | 9610057 A1 | 4/1996 |
| WO | 2013047319 A1 | 4/2013 |

OTHER PUBLICATIONS

Katsuyoshi Kaneko, et al. "Development of Electrodeposition Coating with High Throwing Power through Optiminzation of Base Resin Plasticizer", Mar. 2014, pp. 457-462, vol. 45, No. 2.
Toshitaka Kawanami, et al. "Super Environment-Friendly Electrodeposition Paint", Progress in Organic Coatings, Dec. 2000, pp. 61-62, vol. 40.
Shikha Sinha, "Epoxy Industrial Liquid Coatings Emerge as Prime Solutions for Equipment Protection", Mar. 19, 2021, PCI Magazine. [Retrieved on Dec. 12, 2022]. Retrieved from Internet: <URL: https://www.pcimag.com/articles/108543-epoxy-industrial-liquid-coatings-emerge-as-prime-solution-for-equipment-protection>.
PCI Magazine. "A Major Breakthrough in Corrosion Resistance for Automobiles" Jun. 1, 2005. PCI Magazine. [Retrieved on Dec. 12, 2022]. Retrieved from Internet: <URL: https://www.pcimag.com/articles/83234-a-major-breakthrough-in-corrosion-resistance-for-automobiles>.
Wen, Cui-Zhu, et al. "Study on epoxy-amine/epoxy-acrylate complex cathodic electrodeposition coating" Thermosetting Resin, Sep. 2009, pp. 26-31, vol. 24, No. 5.
Chin-Ping Yang, et al., Synthesis and properties of cationic amine-epoxy adducts and their use in electrodeposition, II, Die Angewandte Makromolekulare Chemis, 1992, pp. 73-87, vol. 196, No. 3368.
Kittel, H., "Electrocoating", pp. 141-221, Chapter 9.1.4, vol. 9, ISBN No. 3-7776-1120-4.

* cited by examiner

*Primary Examiner* — Xiuyu Tai
(74) *Attorney, Agent, or Firm* — Ingrassia Fisher & Lorenz, LLP (57) ABSTRACT

A cathodic electrocoating composition having reduced volatile organic compounds includes: an epoxy resin comprising; a film forming binder, and a cross-linking agent; a pigment paste; water; and about 0.01 to about 10 percent by weight of an oxo-alcohol, based on a total weight of the composition, wherein the resin composition is free of glycol ethers.

20 Claims, 2 Drawing Sheets

CATHODIC ELECTROCOATING COMPOSITION HAVING REDUCED VOLATILE ORGANIC COMPOUNDS

CROSS-REFERENCE TO RELATED APPLICATIONS

This application claims the benefit of U.S. Provisional Application No. 63/194,218 filed May 28, 2021, which is expressly incorporated herein by reference in its entirety.

TECHNICAL FIELD

The present disclosure generally relates to a cathodic electrocoating composition having reduced volatile organic compounds (VOCs). More specifically, the composition includes an oxo-alcohol which minimizes the VOCs and simultaneously allows for excellent defoaming characteristics.

BACKGROUND

Modern cathodic electrocoating systems must fulfill rigid environmental requirements. One focus of recent development work is the reduction of volatile organic compounds (VOCs) according to global standards including a special focus on glycol-ether elimination. The framework for VOC regulations differs based on jurisdiction. For example, US-EPA 24 regulations are significantly more stringent than other jurisdictions due to the avoidance of low volatile plasticizers, e.g. Texanol, with a boiling point of 250° C. and a vapor pressure of about 0.001 kPa at 20° C. Besides VOC contributions, glycol-ethers are also considered to be problematic due to toxicity potential. For example, hexylcellusolve is rated as toxic and butylcellusolve is under evaluation regarding toxicity potential.

In order to meet US EPA 24 requirements, coating polymer backbone modifications are typically required in addition to use of plasticizers with limited evaporation rates at 110° C. Both changes are so far state of the art, but often lead to limitations in paint performance such as robustness and corrosion performance.

Traditional non-VOC plasticizers such as Paraplex WP1, Cryoflex and Texanol are film build agents that tend to exhibit low efficiency at higher costs and with significantly low defoaming performance. Furthermore, non-VOC relevant plasticizers can lead to inferior corrosion performance at low bake conditions (which is important for low and broad bake systems) due to high boiling points and low vapor pressures. Hexylglycol containing pigment pastes also have a high tendency for increased viscosities and viscosity stability.

In addition, current cathodic electrocoating systems typically include powerful silicone defoamers. However, these defoamers can degrade catalysts used in downstream incinerators that are used to remove VOCs before exposure to the environment. Accordingly, there remains opportunity for improvement.

Other desirable features and characteristics of the present disclosure will become apparent from the subsequent detailed description of the disclosure and the appended claims, taken in conjunction with this background of the disclosure.

BRIEF SUMMARY

This disclosure provides a cathodic electrocoating composition having reduced volatile organic compounds and comprising: an epoxy resin comprising; a film forming binder, and a cross-linking agent; a pigment paste; water; and about 0.01 to about 10 percent by weight of an oxo-alcohol, based on a total weight of the composition, wherein the resin composition is free of glycol ethers.

This disclosure also provides a method of disposing an electrocoated film on a substrate, wherein the method comprises: forming an electrodeposition bath comprising an electrocoating composition; dipping the substrate into the electrodeposition bath; connecting the substrate as a cathode; applying a current of from about 240V to about 300V to the substrate to electrocoat the substrate thereby depositing the electrocoated film on the substrate; removing the electrocoated substrate from the electrodeposition bath; and baking the electrocoated substrate such that the electrocoated film has a thickness of: greater than about 30 micrometers when the voltage is about 240V; greater than about 38 micrometers when the voltage is about 280V, and/or greater than about 45 micrometers when the voltage is about 300V.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the disclosure. Furthermore, there is no intention to be bound by any theory presented in the preceding background or the following detailed description.

Embodiments of the present disclosure are generally directed to cathodic electrocoating composition and methods for forming and using the same. For the sake of brevity, conventional techniques related to such compositions may not be described in detail herein. Moreover, the various tasks and process steps described herein may be incorporated into a more comprehensive procedure or process having additional steps or functionality not described in detail herein. In particular, various steps in the manufacture of such compositions are well-known and so, in the interest of brevity, many conventional steps will only be mentioned briefly herein or will be omitted entirely without providing the well-known process details.

In this disclosure, the terminology "about" can describe values ±0.1, 0.5, 1, 2, 3, 4, 5, 6, 7, 8, 9, or 10%, in various embodiments. Moreover, it is contemplated that, in various non-limiting embodiments, all values set forth herein may be alternatively described as approximate or "about."

Moreover, it is contemplated that, in various non-limiting embodiments, all weight percents described herein may be based on a total weight of the composition itself or based on a total weight of an electrocoating bath as a whole.

In various embodiments, this disclosure provides a cathodic electrocoating composition having reduced volatile organic compounds and comprising: an epoxy resin comprising; a film forming binder, and a cross-linking agent; a pigment paste; water; and about 0.01 to about 10 percent by weight of an oxo-alcohol, based on a total weight of the composition, wherein the resin composition is free of glycol ethers. In one embodiment, the coating composition is based on a reduced amount of plasticizers with low evaporation rate at 110° C. in combination with oxo-alcohols, e.g. propylheptanol. The use of propylheptanol can lead to an extraordinary film build increase, which enables lower plasticizer and solvents levels with superior gassing and defoaming characteristics. Such systems show reduced VOC-levels at same film build requirements. The lower amount of plasticizers allow for improved corrosion behavior at low bake conditions.

Electrocoating Composition

The cathodic electrocoating composition of this disclosure is typically designed for coating a substrate. The electrocoating composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport. In various embodiments, the substrate is described as "e-coated" after coating with the composition of this disclosure.

The composition can be further described as a one-component electrocoating composition/system or as a two-component electrocoating composition/system.

Epoxy-Resin

As first introduced above, the composition includes an epoxy resin. In one embodiment, the epoxy resin is an emulsion, e.g. in a one-component electrocoating system. In another embodiment, the epoxy-resin is not an emulsion, e.g. in a two-component electrocoating system. However, it is contemplated that the use of the emulsion is not strictly tied to whether the system is a one- or two-component system. The epoxy-resin, whether or not an emulsion, can be, include, consist essentially of, or consist of, a film-forming binder and a cross-linking agent. The terminology "consist essentially of" describes various embodiments, that are free of one or more monomers, polymers, and/or additives that are not the film-forming binder and/or cross-linking agent. Such monomers, polymers, and/or additives may be any known in the art.

If an emulsion, the emulsion includes a continuous phase and a dispersed phase. The emulsion is not particularly limited and may be further described as an oil-in-water (O/W) emulsion or as a water-in-oil (W/O) emulsion, as conventionally understood. The emulsion is determined to exist based on visual inspection by one of skill in the art.

In various embodiments, the continuous phase is aqueous and includes, is, consists essentially of, or consists of, an aqueous carrier and optionally an acid. For example, the continuous phase may consist essentially of the aqueous carrier and the acid and be free of, or include less than 5, 4, 3, 2, 1, 0.5, 0.1, 0.05, or 0.01, weight percent of other additives, polymers, surfactants, etc. The aqueous carrier may be or include water such as DI water. In various embodiments, the aqueous carrier includes water and/or a polar solvent such as an alcohol, or other polar solvent. Alternatively, the carrier may be described as a polar carrier. In various non-limiting embodiments, all values and ranges of values, both whole and fractional, including and between the aforementioned values are hereby expressly contemplated for use herein.

Referring now to the optional acid, the acid is not particularly limited and may be any conventional acid. For example, the acid may be an organic acid and/or a mineral acid to fully or partially neutralize the epoxy resin. The acid may be utilized in any amount chosen by one of skill in the art. In various embodiments, the acid is utilized in an amount such that a molar ratio between a neutralizing acid and amine content in the emulsion, as understood by one of skill in the art, is from about 20 to about 80, about 25 to about 75, about 30 to about 70, about 35 to about 65, about 40 to about 60, about 45 to about 55, about 45 to about 50, or about 30 to about 60, %. In various non-limiting embodiments, all values and ranges of values, both whole and fractional, including and between the aforementioned values are hereby expressly contemplated for use herein.

In other embodiments, and referring now to the dispersed phase, the dispersed phase can include, be, consist essentially of, or consist of, a film-forming binder, such as an epoxy-amine, and/or a cross-linking agent, each described in greater detail below. In various embodiments, the dispersed phase consists essentially of the film-forming binder and/or cross-linking agent and is free of, or include less than 5, 4, 3, 2, 1, 0.5, 0.1, 0.05, or 0.01, weight percent of other additives, polymers, surfactants, etc. In various embodiments, the dispersed phase is in the form of discrete, identifiable particles. The emulsion is not particularly limited relative to particle size of the dispersed phase and may be a microemulsion or a nano-emulsion. Typically, the "particles" of the emulsion are particles of an epoxy resin and/or cross-linking agent, first introduced above. For example, such particles are not particularly limited in size or shape.

In various embodiments, the epoxy-resin is utilized in an amount of from about 10 to about 35, about 15 to about 30, or about 20 to about 25, weight percent based on a total weight of the composition. In various non-limiting embodiments, all values and ranges of values, both whole and fractional, including and between the aforementioned values are hereby expressly contemplated for use herein.

In various embodiments, the emulsion may include a cathodic binder (such as a film forming binder) which, along with a blocked isocyanate, can be the principal resinous ingredients in the electrocoating composition and may be present in amounts of from about 10 to about 70 wt. %, alternatively from about 20 to about 60 wt. %, or alternatively from about 30 to about 50 wt. %, based on a total solids of the electrocoating composition. An electrocoating bath may be formed by reducing the solids with an aqueous medium. In various non-limiting embodiments, all values and ranges of values, both whole and fractional, including and between the aforementioned values are hereby expressly contemplated for use herein.

Film-Forming Binder

In various embodiments, the film-forming binder is the reaction product of an amine compound and an epoxy reactant and may be described as an epoxy-amine adduct. The film-forming binder is not particularly limited and may be any formed from the reaction of any amine compound and any epoxy reactant. In various embodiments, the epoxy resin and/or the film-forming binder and/or the cross-linking agent may be as described in one or more of U.S. Pat. Nos. 4,419,467 or 6,207,731, each of which is expressly incorporated herein by reference in its entirety in various non-limiting embodiments.

In various embodiments, the film-forming binder is utilized in an amount of from about 50 to about 95, about 55 to about 90, about 60 to about 85, about 65 to about 80, about 60 to about 80, or about 70 to about 75, weight percent calculated based on a total weight of the solids of a dispersion and/or emulsion. Typical solid contents of such emulsions and/or dispersions are about 30 to about 40, about 30 to about 35, about 35 to about 40, or about 30, 31, 32, 33, 34, 35, 36, 37, 38, 39, or 40, wt %. In various non-limiting embodiments, all values and ranges of values, both whole and fractional, including and between the aforementioned values are hereby expressly contemplated for use herein.

Cross-Linking Agent

Referring now to the cross-linking agent, this agent may also be any known in the art. In various embodiments, the cross-linking agent is neutralized with an acid to form a water-soluble product. The crosslinking agent may be an aliphatic, cycloaliphatic, or aromatic isocyanate such as hexamethylene diisocyanate, cyclohexamethylene diisocyanate, toluene diisocyanate, methylene diphenyl diisocyanate, and the like. These isocyanates may be pre-reacted with a blocking agent such as oximes, alcohols, or caprolactams which selectively block the isocyanate functionality. The isocyanates may be unblocked by heating to separate the blocking agent from the isocyanate group of the isocyanate thereby providing a reactive isocyanate group. Isocyanates and blocking agents are conventionally known.

In various embodiments, the cross-linking agent is utilized in an amount of from about 5 to about 50, about 10 to about 45, about 15 to about 40, about 20 to about 35, or about 25 to about 30, weight percent based on a total weight of the composition. In various non-limiting embodiments, all values and ranges of values, both whole and fractional, including and between the aforementioned values are hereby expressly contemplated for use herein.

In various embodiments, the epoxy-amine adduct is as described in WO1996010057. In other embodiments, the blocked isocyanate is as described in EP 0476 514 B 1. Both references are expressly incorporated herein by reference in various non-limiting embodiments.

In various embodiments, the epoxy is transferred to an epoxy-amine adduct by adding amines. For example, about 10 to about 35 wt % epoxy can be present in the about 50 to about 95% epoxy-amine adduct. Thus, the sum of 95 parts epoxy-amine-adduct and 5 parts cross-linking agent or 50 parts epoxy-amine-adduct and 50 parts cross-linking agents totals 100%. This is calculated on the resin solids.

Pigment Paste

The electrocoating composition can further include a pigment which may be incorporated into the composition in the form of a pigment paste. The pigment paste may be prepared by grinding or dispersing a pigment into a pigment grinding vehicle and optional additives such as wetting agents, surfactants, and defoamers. The pigment may be ground to a particle size of from about 6 to about 8 according to a Hegman grinding gauge. The pigment may include titanium dioxide, carbon black, barium sulfate, clay, and the like. In various embodiments, pigments having high surface areas and oil absorbencies are utilized in a limited amount due to undesirable effects on coalescence and flow of the coating layer. A pigment to binder weight ratio may be about 2:1 to about 6:1 or about 3:1 to about 4:1. In other embodiments, the pigment to binder weight ratio may be less than about 0.5:1, such as less than about 0.4:1, and for example about 0.1:1 to 0.4:1, such as 1:5. Higher pigment to binder weight ratios have been found to adversely affect coalescence and flow.

Pigments which can be used in embodiments described herein include titanium dioxide, basic lead silicate, strontium chromate, carbon black, iron oxide, clay and the like. Pigments with high surface areas and oil absorbencies should be used judiciously because these can have an undesirable effect on coalescence and flow of the electrodeposited coating.

In certain embodiments, the pigment paste includes an anti-corrosive pigment or blends of anticorrosive pigments. Exemplary anti-corrosive pigments include metallic chromates, phosphates, phosphites, borates, borosilicates, phosphosilicates, molybdates, oxides, and rare earth compounds. Organic anticorrosive agents may optionally also be present; they include benzotriazoles, morpholines, azoles, calcium alkyl-aryl sulfonates, diamines, and metal salts of dinonylnapathalene sulfonates.

In various embodiments, the pigment is utilized in an amount of from about 20 to about 60, about 25 to about 55, about 30 to about 50, about 35 to about 45, or about 40 to about 45, weight percent based on a total weight of the composition. In various non-limiting embodiments, all values and ranges of values, both whole and fractional, including and between the aforementioned values are hereby expressly contemplated for use herein.

Additives

The electrocoating composition may further include, or be free of, one or more additives such as wetting agents, surfactants, defoamers, and the like. Examples of surfactants and additional wetting agents include acetylenic alcohols available from Air Products and Chemicals as "Surfynol 104". These additives, when present, may be present in an amount of from about 0.1 to about 20, about 0.5 to about 15, about 0.5 to about 10, about 0.5 to about 5, about 0.5 to about 1, about 1 to about 20, about 1 to about 15, about 1 to about 10, about 5 to about 20, about 5 to about 15, about 5 to about 10, about 10 to about 20, or about 15 to about 20, wt. % based on total binder solids of the electrocoating composition. Binder solids include not only the resins but also additives whereas resin solids do not. However, due to small quantity of additives in the formulation, the actual difference is typically very small.

The electrocoating composition may further include a plasticizer to promote flow or be free of such a plasticizer. Examples of suitable plasticizers may be high boiling water immiscible materials such as ethylene or propylene oxide adducts of nonyl phenols or bisphenol A. The electrocoating composition may include the plasticizer in an amount of from about 0.1 to about 15, about 0.5 to about 15, about 0.5 to about 10, about 0.5 to about 5, about 0.5 to about 1, about 1 to about 15, about 1 to about 10, about 5 to about 15, about 5 to about 10, or about 10 to about 15, wt. % based on total binder solids of the electrocoating composition. Binder solids include not only the resins but also additives whereas resin solids do not. However, due to small quantity of additives in the formulation, the actual difference is typically very small. In various non-limiting embodiments, all values and ranges of values, both whole and fractional, including and between the aforementioned values are hereby expressly contemplated for use herein.

In various embodiments, the composition is free of a defoamer, such as a silicone defoamer. In fact, in various embodiments, the composition is free of defoamers wherein the terminology "free of" can describe less than 5, 4, 3, 2, 1, 0.05, 0.01, 0.005, or 0.001, weight percent of a defoamer based on a total weight of the composition. Alternatively, the composition may be completely free of defoamers. Alternatively, a defoamer can be utilized. If utilized, the defoamer may be used in an amount of from about 0.01 to about 1.2, about 0.01 to about 0.6, about 0.01 to about 0.3, or any value from about 0.01 to about 1.2, including all in between, wt % calculated on paste as delivered. In various non-limiting embodiments, all values and ranges of values, both whole and fractional, including and between the aforementioned values are hereby expressly contemplated for use herein.

Oxo-Alcohol

The composition also includes an oxo-alcohol, which may be any known in the art. Typically, oxo-alcohols described as alcohols prepared by adding carbon monoxide and hydrogen to an olefin to obtain an aldehyde via hydroformylation and then hydrogenating the aldehyde to obtain the oxo-alcohol. In various embodiments, the oxo-alcohol is chosen from 2-Methyl-2-butanol, n-butanol, 2-ethylhexanol, 2-propylheptanol, isononyl alcohol, isodecyl alcohol, and combinations thereof. In one embodiment, the oxo-alcohol is 2-propylheptanol. It is contemplated that any one oxo-alcohol, such as 2-propylheptanol, may be utilized to the exclusion of any one or more other oxo-alcohols, other alcohols in general, and/or any glycol ethers.

In various embodiments, the oxo-alcohol is utilized in an amount of from 0.01 to about 10, about 0.01 to about 5, about 0.01 to about 1, about 0.01 to about 0.09, about 0.02 to about 0.08, about 0.03 to about 0.07, about 0.04 to about 0.06, about 0.05 to about 0.06, about 1 to about 10, about 2 to about 9, about 3 to about 8, about 4 to about 7, or about 5 to about 6, weight percent based on a total weight of the composition or a total weight of bath materials. In various embodiments, the amount is from about 0.01 to about 1, about 0.02 to about 2, or about 0.01 to about 5, weight percent based on a total weight of the composition or a total weight of bath materials. The oxo-alcohol might be present both, in the paste and in the resin dispersion. In various non-limiting embodiments, all values and ranges of values, both whole and fractional, including and between the aforementioned values are hereby expressly contemplated for use herein.

In various embodiments, the pigment paste is combined with the oxo-alcohol, which is described in greater detail below. Alternatively, the pigment may be independent from the oxo-alcohol. In various embodiments, if the oxo-alcohol is combined with the pigment paste, the oxo-alcohol is present in an amount of from about 0.01 to about 20.0 wt %, or any value or range of values described above, based on a total weight of the pigment paste. In various non-limiting embodiments, all values and ranges of values, both whole and fractional, including and between the aforementioned values are hereby expressly contemplated for use herein.

Propylheptanol containing pastes, unlike the aforementioned hexylglycol pastes, do not have a tendency for higher viscosity. As such, propylheptanol is surprisingly found to be a suitable, excellent low cost replacement especially for hexylglycol with an improved EHS footprint.

Moreover, due to low water solubility and good compromise of Hansen solubility parameters (disperse (high), dipolar and hydrogen bonding (low)) and higher retention times of propylheptanol in a deposited organic phase during an endo-osmosis step, propylheptanol is surprisingly found to be a suitable, excellent low cost replacement especially for hexylglycol. In such scenarios, remaining propylheptanol can have a strong influence on film build capability.

In other embodiments, a high efficiency of propylheptanol on film build capability allows for lower VOC containing CED systems to be formulated, especially when compared to traditional glycolethers (e.g. butylglycol and hexylglycol) in CED systems which can be metabolized by bacteria to alkoxyacids (e.g. BAA and HAA) and cannot be removed via UF- and anolyte membranes. For example, the presence of alkoxyacids leads to problems in e-coating processes relative to mapping, weak throwing power, dirt formation, and UF-flux rate. For example, propylheptanol could be simply metabolized in case of bacterial infestations to monocarboxylic acids and can be removed via UF- and/or anolyte membranes.

In other embodiments, it is observed that high film build agents e.g. hexylglycol have a non-ionic surfactant character which tends to lead to significant foam formation and gassing defects in CED systems. Modern "up-side down" conveyor systems like Rodip, E-shuttle or Varioshuttles typically require tailormade CED systems with improved defoaming characteristics. Improved defoaming characteristics could be achieved with higher solvent loads of non-foaming solvents such as Dowanol PM (methoxypropanol), phenoxypropanol or defoaming detergents (e.g. surfactants and/or siloxane derivates). The excellent defoaming characteristics of propylheptanol makes propylheptanol a suitable, excellent low cost replacement especially for hexylglycol without negative influences on costs, VOC, inter-coat adhesion and catalytic operating incinerators wherein siloxanes are problematic.

Water

The composition also includes water. The water may be of any type, such as DI water, tap water, etc. The total amount of water may be described as water added plus any water present with one or more components or may be described solely as the amount of water added. The water is typically present in an amount of from about 60 to about 90%, about 65 to about 85, about 70 to about 80, or about 70 to about 75, based on a total weight of the composition and/or bath-materials. In various non-limiting embodiments, all values and ranges of values, both whole and fractional, including and between the aforementioned values are hereby expressly contemplated for use herein.

Volatile Organic Compounds

The coating composition has reduced VOCs when compared to other similar coating compositions that do not include the oxo-alcohol and instead utilize, for example, glycol ethers. In fact, in various embodiments, the composition is free of glycol ethers wherein the terminology "free of" can describe less than 5, 4, 3, 2, 1, 0.05, 0.01, 0.005, or 0.001, weight percent of the glycol ethers based on a total weight of the composition. Alternatively, the composition may be completely free of the glycol ethers.

When the disclosure describes reduced VOCs, this typically describes an number of VOCs between about 0.1 and about 4, e.g. about 0.01 to about 1, about 1 to about 4, or any value or range of values therebetween, in bath materials. Required film build adjustments are typically done via voltage, bath temperature, plasticizer and solvent adjustments. Common water-soluble solvents like methoxypropanol, butylcellusolve, butoxypropanol etc. are VOC relevant and have a relative low impact on film build increase. A replacement, either in whole or in part, with an oxo-alcohol such as propylheptanol has a significant stronger response on film build and therefore the required addition of VOC relevant solvents can be reduced significantly. The film build response can be evaluated via voltage- film build response studies (e.g. using a voltage ladder). In various non-limiting embodiments, all values and ranges of values, both whole and fractional, including and between the aforementioned values are hereby expressly contemplated for use herein.

Additional Embodiments

In various embodiments, the epoxy resin is present in an amount of from about 10 to about 35 weight percent based on a total weight of the composition; the film-forming binder is an epoxy-amine adduct and is present in an amount of from about 50 to about 95 weight percent based on a total weight of the composition; and the cross-linking agent is a blocked isocyanate and is present in an amount of from about 5 to about 50 weight percent based on a total weight of the composition. In various non-limiting embodiments, all values and ranges of values, both whole and fractional, including and between the aforementioned values are hereby expressly contemplated for use herein.

In other embodiments, the cross-linking agent is a blocked isocyanate and is present in an amount of from about 5 to about 50 weight percent based on a total weight of the composition.

In other embodiments, the epoxy resin is present in an amount of from about 10 to about 35 weight percent based on a total weight of the composition; the film-forming binder is an epoxy-amine adduct and is present in an amount of from about 50 to about 95 weight percent based on a total weight of the composition; the cross-linking agent is a blocked isocyanate and is present in an amount of from about 5 to about 50 weight percent based on a total weight of the composition; the pigment paste comprises a pigment chosen from $TiO_2$, carbon black, aluminum-silicates, and combinations thereof and is present in an amount of from about 20 to about 60 weight percent based on a total weight of the composition; the water is present in an amount of from about 40 to about 60 weight percent based on a total weight of the composition; and the oxo-alcohol is 2-propylheptanol; and wherein the composition further comprises about zero to about 10 weight percent of one or more wetting/dispersing agents, organic acids, and/or catalysts, based on a total weight of the composition. In various non-limiting embodiments, all values and ranges of values, both whole and fractional, including and between the aforementioned values are hereby expressly contemplated for use herein.

Method

This disclosure also provides a method of disposing an electrocoated film on a substrate, wherein the method includes: forming an electrodeposition bath comprising the electrocoating composition of claim 1; dipping the substrate into the electrodeposition bath; connecting the substrate as a cathode; applying a current of from about 240V to about 300V to the substrate to electrocoat the substrate thereby depositing the electrocoated film on the substrate; removing the electrocoated substrate from the electrodeposition bath; and baking the electrocoated substrate such that the electrocoated film has a thickness of: greater than about 30 micrometers when the voltage is about 240V; greater than about 38 micrometers when the voltage is about 280V, and/or greater than about 45 micrometers when the voltage is about 300V. Each one of these steps may be performed using methods, temperatures, times, etc., chosen by one of skill in the art. In various non-limiting embodiments, all values and ranges of values, both whole and fractional, including and between the aforementioned values are hereby expressly contemplated for use herein. In various non-limiting embodiments, one or more methods, temperatures, times, etc., used in the above method may be as described in H. Kittel Volume 9. Chapter 9.1.4 ISBN Number: 3-7776-1120-4, which is expressly incorporated herein in its entirety in various non-limiting embodiments.

Examples

Examples are provided below for the formation of various constituents in an electrocoating bath and for the electrocoating bath composition.

More specifically, four Baths (1-4) are created as set forth below wherein hexylglycol, phenoxypropanol, Texanol, and 2-propylheptanol are used in various Compositions (1-4), respectively. These solvents are used in approximately 7 wt % calculated on the pigment-paste as delivered. The remaining portions of the Compositions are identical to each other.

TABLE 1

| Baking condition 18' 150° C. Object Coating Parameters: 3' + 30" 34° C. | | Bath 1 Composition 1 Hexylglycol | Bath 2 Composition 2 Phenoxypropanol |
|---|---|---|---|
| Film thickness (μm) | 200 V | 25 | 21 |
| Coulomb (C) | | 42 | 38 |
| Electric charge density (AS/cm³) | | 57 | 62 |
| Roughness LT = 5.6 mm (0.800 * 5) | | 0.353 | 0.363 |
| Gloss 60° | | 44 | 59 |
| Film thickness (μm) | 240 V | 27 | 23 |
| Coulomb (C) | | 45 | 41 |
| Electric charge density | | 57 | 61 |
| Roughness LT = 5.6 mm (0.800 * 5) | | 0.388 | 0.360 |
| Gloss 60° | | 46 | 60 |
| Film thickness (μm) | 280 V | 31 | 30 |
| Coulomb (C) | | 49 | 49 |
| Electric charge density (AS/cm³) | | 54 | 56 |
| Roughness LT = 5.6 mm (0.800 * 5) | | 0.375 | 0.508 |
| Gloss 60° | | 49 | 60 |
| Film thickness (μm) | 300 V | 36 | 35 |

TABLE 1-continued

| | | | |
|---|---|---|---|
| Coulomb (C) | | 55 | 54 |
| Electric charge density (AS/cm$^3$) | | 52 | 52 |
| Roughness LT = 5.6 mm (0.800 * 5) | | 0.526 | 0.539 |
| Gloss 60° | | 50 | 57 |
| pH-@ 20° C. | | 6.1 | 6.0 |
| Conductivity @ 20° C. (μS/cm) | | 1340 | 1340 |
| Solids @ 30 '180° C. (%) | | 12.3 | 12.7 |
| Ash (%) | | 2.54 | 2.60 |
| Ash-binder ratio | | 0.26 | 0.26 |
| MEQ-Acid (mmol) | | 40.8 | 40.4 |

| Baking condition 18' 150° C. Object Coating Parameters: 3' + 30" 34° C. | | Bath 3 Composition 3 Texanol | Bath 4 Composition 4 2-Propylheptanol |
|---|---|---|---|
| Film thickness (μm) | 200 V | 22 | 22 |
| Coulomb (C) | | 39 | 41 |
| Electric charge density (AS/cm$^3$) | | 60 | 63 |
| Roughness LT = 5.6 mm (0.800 * 5) | | 0.348 | 0.403 |
| Gloss 60° | | 61 | 50 |
| Film thickness (μm) | 240 V | 26 | 31 |
| Coulomb (C) | | 42 | 47 |
| Electric charge density | | 55 | 52 |
| Roughness LT = 5.6 mm (0.800 * 5) | | 0.326 | 0.491 |
| Gloss 60° | | 61 | 50 |
| Film thickness (μm) | 280 V | 30 | 39 |
| Coulomb (C) | | 48 | 58 |
| Electric charge density (AS/cm$^3$) | | 54 | 51 |
| Roughness LT = 5.6 mm (0.800 * 5) | | 0.471 | 0.578 |
| Gloss 60° | | 62 | 50 |
| Film thickness (μm) | 300 V | 35 | 45 |
| Coulomb (C) | | 53 | 63 |
| Electric charge density (AS/cm$^3$) | | 52 | 48 |
| Roughness LT = 5.6 mm (0.800 * 5) | | 0.530 | 0.807 |
| Gloss 60° | | 61 | 47 |
| pH-@ 20° C. | | 6.0 | 6.2 |
| Conductivity @ 20° C. (μS/cm) | | 1360 | 1340 |
| Solids @ 30 '180° C. (%) | | 12.9 | 12.4 |
| Ash (%) | | 2.65 | 2.62 |
| Ash-binder ratio | | 0.26 | 0.27 |
| MEQ-Acid (mmol) | | 39.6 | 40.8 |

In these Baths, the following components are used in the Compositions:

The film-forming resin is used in an amount of from about 5.0 up to about 9.0 wt % based on CED bath material.

The cross-linking agent is used in an amount of from about 1.5 up to about 5.0 wt % on CED bath material.

The pigment paste is used in an amount of from about 5.0 to about 12.0 wt % calculated on CED bath-material.

The additives in total (defoamer, flow-agent etc.) are used in an amount of from about 0.01 up to about 5.0 wt % calculated on CED bath materials.

Figure 1:
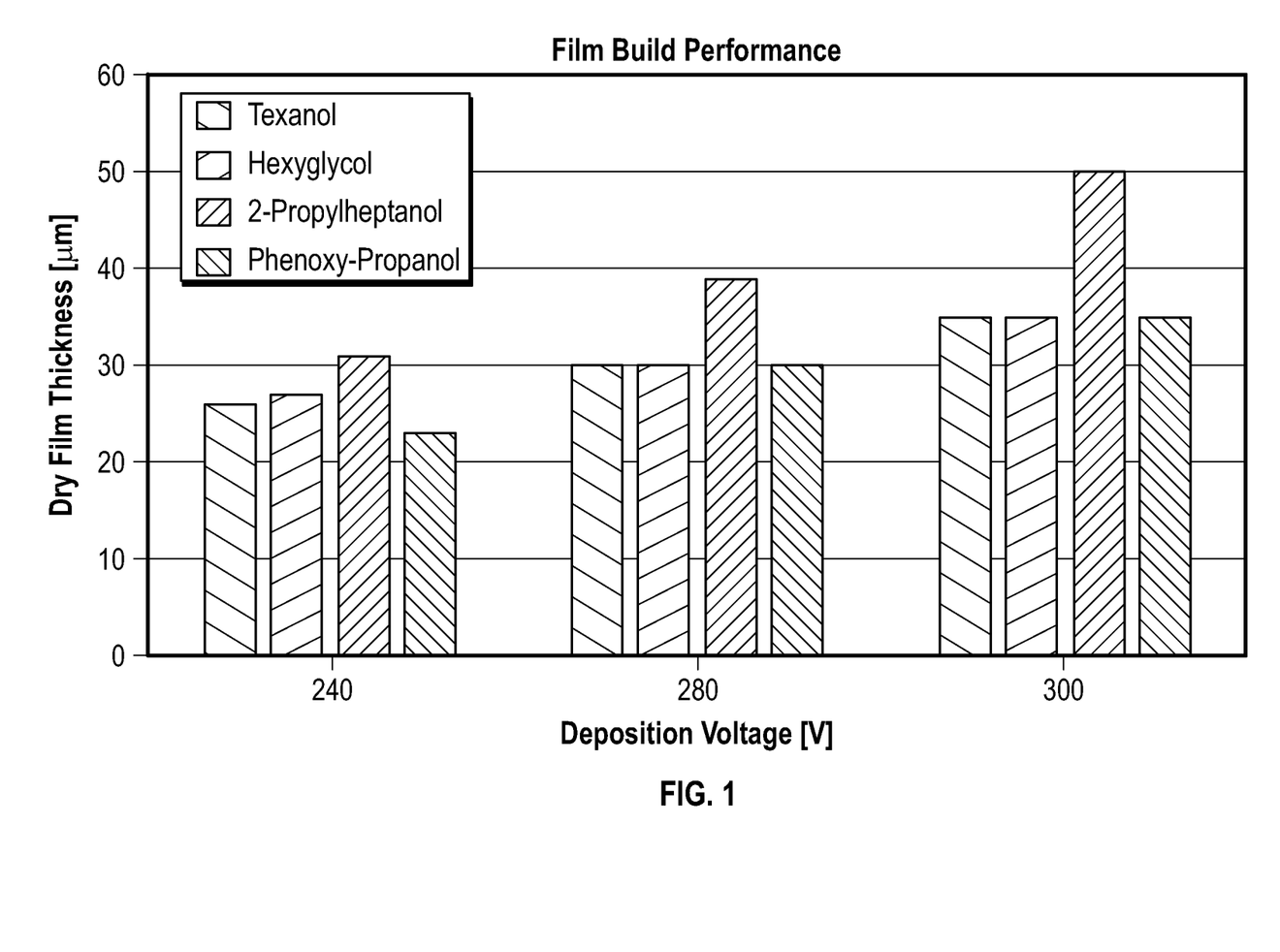
FIG. 1 is a bar-graph that shows the film build results described in the Examples.

The results of these evaluations are set forth in FIG. 1.

The same Baths and Compositions as set forth above were also evaluated to determine foam levels. More specifically, a defoaming test was developed as follows:

Fill a 250 ml Graduated Cylinder DIN 250: 2 up to 100 ml with the Compositions

Seal the cylinder with a stopper

Turn the cylinder upside down by 180° for 10 times

Place the cylinder on a horizontal surface and determine the upper foam level as the start Remove the stopper and start the time measurement (stopwatch)

Determine the development over time of the foam level for example at 60 s, 180 s and 300 s The Bath setup for the defoaming tests was as follows:

Bath materials were prepared using the standard formulations described above (determined @30 min 180° C.)

| 1. p/b | 0.18-0.23 |
|---|---|
| 2. solids | 18-22% |

Figure 2:
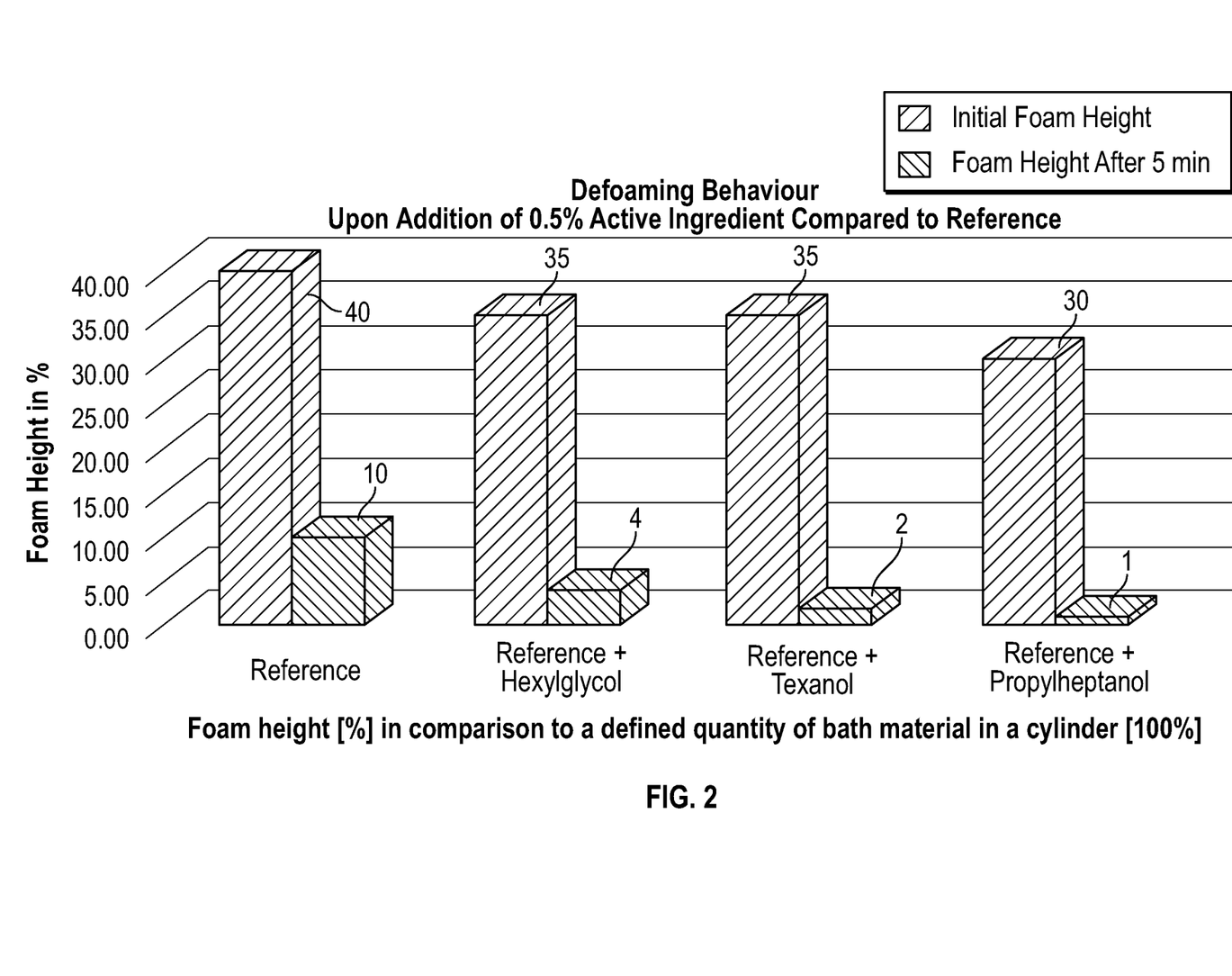
FIG. 2 is a bar-graph that shows the defoaming behavior results described in the Examples.

The Results are set forth in FIG. 2 wherein the reference bath for FIG. 2 was setup at p/b 0.21 and 19% solids (determined @30 min 180° C.) DI-water 47%; Emulsion 45%; Pigment paste 8%.

The data generated by the above evaluations and set forth in the Figures demonstrates that the use of 2-propylheptanol in CED bath-materials contributes to a better defoaming behavior compared to standard solvents used in CED baths like glycolethers. Furthermore, it is clear to see that the use of equal amounts of 2-propylheptanol compared to other typically used solvents shows much better film-build performance. This evidences that this technology produces results that are superior to, and unexpected over, the comparative examples.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A cathodic electrocoating composition comprising:
   an epoxy resin comprising;
      a film forming binder; and
      a cross-linking agent;
   a pigment paste;
   water; and
   about 0.01 to about 10 percent by weight of an oxo-alcohol, based on a total weight of the composition, wherein the cathodic electrocoating composition is free of glycol ethers.

2. The composition of claim 1 wherein the oxo-alcohol is 2-propylheptanol.

3. The composition of claim 2 wherein the 2-propylheptanol is present in an amount of from about 0.01 to about 5 percent by weight based on a total weight of the composition.

4. The composition of claim 1 wherein the oxo-alcohol is present in an amount of from about 0.01 to about 5 percent by weight based on a total weight of the composition.

5. The composition of claim 1 wherein the epoxy resin is an emulsion comprising the film forming binder and the cross-linking agent.

6. The composition of claim 1 that is free of a defoamer.

7. The composition of claim 6 wherein the defoamer is a silicone defoamer.

8. The composition of claim 1 wherein the oxo-alcohol is combined with the pigment paste.

9. The composition of claim 1 wherein the oxo-alcohol is combined with the pigment paste and is present in an amount of from about 0.01 to about 10 weight percent based on a total weight of the pigment paste.

10. The composition of claim 1 wherein the oxo-alcohol is present in an amount of from about 0.01 to about 5 weight percent based on a total weight of the composition.

11. The composition of claim 1 wherein
   the epoxy resin is present in an amount of from about 10 to about 35 weight percent based on a total weight of the composition;
   the film-forming binder is an epoxy-amine adduct and is present in an amount of from about 50 to about 95 weight percent based on a total weight of the composition; and
   the cross-linking agent is a blocked isocyanate and is present in an amount of from about 5 to about 50 weight percent based on a total weight of the composition.

12. The composition of claim 1 wherein the cross-linking agent is a blocked isocyanate and is present in an amount of from about 5 to about 50 weight percent based on a total weight of the composition.

13. The composition of claim 1 wherein
   the epoxy resin is present in an amount of from about 10 to about 35 weight percent based on a total weight of the composition;
   the film-forming binder is an epoxy-amine adduct and is present in an amount of from about 50 to about 95 weight percent based on a total weight of the composition;
   the cross-linking agent is a blocked isocyanate and is present in an amount of from about 5 to about 50 weight percent based on a total weight of the composition;
   the pigment paste comprises a pigment chosen from $TiO_2$, carbon black, aluminum-Silicates, and combinations thereof and is present in an amount of from about 20 to about 60 weight percent based on a total weight of the composition;
   the water is present in an amount of from about 40 to about 60 weight percent based on a total weight of the composition; and
   the oxo-alcohol is 2-propylheptanol; and
   wherein the composition further comprises about zero to about 10 weight percent of one or more wetting/dispersing agents, organic acids, and/or catalysts, based on a total weight of the composition.

14. The composition of claim 2 wherein the oxo-alcohol is combined with the pigment paste and is present in an amount of from about 0.01 to about 10 weight percent based on a total weight of the pigment paste.

15. The composition of claim 2 wherein the oxo-alcohol is present in an amount of from about 0.01 to about 5 weight percent based on a total weight of the composition.

16. The composition of claim 2 wherein
   the epoxy resin is present in an amount of from about 10 to about 35 weight percent based on a total weight of the composition;
   the film-forming binder is an epoxy-amine adduct and is present in an amount of from about 50 to about 95 weight percent based on a total weight of the composition; and
   the cross-linking agent is a blocked isocyanate and is present in an amount of from about 5 to about 50 weight percent based on a total weight of the composition.

17. The composition of claim 2 wherein
   the epoxy resin is present in an amount of from about 10 to about 35 weight percent based on a total weight of the composition;
   the film-forming binder is an epoxy-amine adduct and is present in an amount of from about 50 to about 95 weight percent based on a total weight of the composition;
   the cross-linking agent is a blocked isocyanate and is present in an amount of from about 5 to about 50 weight percent based on a total weight of the composition;
   the pigment paste comprises a pigment chosen from $TiO_2$, carbon black, aluminum-Silicates, and combinations thereof and is present in an amount of from about 20 to about 60 weight percent based on a total weight of the composition;
   the water is present in an amount of from about 40 to about 60 weight percent based on a total weight of the composition; and
   wherein the composition further comprises about zero to about 10 weight percent of one or more wetting/dispersing agents, organic acids, and/or catalysts, based on a total weight of the composition.

18. The composition of claim 1, wherein the water is present in an amount of from about 60 to about 90%, based on a total weight of the composition.

19. A method of disposing an electrocoated film on a substrate, wherein the method comprises:
   forming an electrodeposition bath comprising the cathodic electrocoating composition of claim 1;
   dipping the substrate into the electrodeposition bath;
   connecting the substrate as a cathode;
   applying a current of from about 240V to about 300V to the substrate to electrocoat the substrate thereby depositing the electrocoated film on the substrate;

removing the electrocoated substrate from the electrodeposition bath; and baking the electrocoated substrate such that the electrocoated film has a thickness of:

greater than about 30 micrometers when the voltage is about 240V;

greater than about 38 micrometers when the voltage is about 280V, and/or greater than about 45 micrometers when the voltage is about 300V.

20. A substrate comprising an electrocoated film disposed thereon, wherein the electrocoated film is formed from the cathodic electrocoating composition of claim 1 and wherein the electrocoated film has a thickness of greater than about 30 micrometers.

* * * * *